(12) United States Patent
Vigliar et al.

(10) Patent No.: US 9,020,276 B2
(45) Date of Patent: Apr. 28, 2015

(54) HARDWARE COPROCESSOR FOR STRIPE-BASED INTEREST POINT DETECTION

(71) Applicant: STMicroelectronics S.r.l., Agrate Brianza (MI) (IT)

(72) Inventors: Mario Vigliar, Nocera Superiore (IT); Gian Domenico Licciardo, Montoro Inferiore (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 143 days.

(21) Appl. No.: 13/869,609

(22) Filed: Apr. 24, 2013

(65) Prior Publication Data

US 2013/0301930 A1 Nov. 14, 2013

Related U.S. Application Data

(60) Provisional application No. 61/637,520, filed on Apr. 24, 2012.

(51) Int. Cl.
*G06K 9/62* (2006.01)
*G06K 9/00* (2006.01)
*G06K 9/46* (2006.01)
*G06K 9/68* (2006.01)

(52) U.S. Cl.
CPC .......... *G06K 9/6217* (2013.01); *G06K 9/00973* (2013.01); *G06K 9/4671* (2013.01); *G06K 9/6857* (2013.01)

(58) Field of Classification Search
CPC ............ G06K 9/18; G06K 9/46; G06K 9/48; G06T 2207/10016; G06T 7/0081; G06T 5/001; G06F 17/30265; G06F 17/30247
USPC .......................... 382/159, 195, 170, 224, 190
See application file for complete search history.

(56) References Cited

U.S. PATENT DOCUMENTS

| 6,711,293 | B1 | 3/2004 | Lowe | |
|---|---|---|---|---|
| 8,126,190 | B2 | 2/2012 | Jung et al. | |
| 8,792,673 | B2 | 7/2014 | Levien et al. | |
| 2012/0183224 | A1* | 7/2012 | Kirsch | 382/195 |

OTHER PUBLICATIONS

Pettersson et al: "Online stereo calibration using FPGAs", IEEE, 2005.*
M. Basu, "Gaussian-Based Edge-Detection Methods—A Survey", IEEE Trans. on Systems, Man and Cybernetics—Part C, 32(3), 2002, pp. 252-260.
D. Lowe, "Distinctive Image Features from Scale-Invariant Keypoints", International Journal of Computer Vision (2004), 60(2), pp. 91-110.

(Continued)

*Primary Examiner* — Ruiping Li
(74) *Attorney, Agent, or Firm* — Seed IP Law Group PLLC

(57) ABSTRACT

A hardware coprocessor architecture calculates the Difference-of-Gaussian (DoG) pyramid of an input image and extracts from this the interest points to be used in several image detection algorithms. Advantages of the architecture include the possibility to process the image by stripes, namely by blocks having one dimension coincident with the input image width, in the absence of an input frame buffer and the possibility to avoid RAM memory. The coprocessor is suitable to be tightly coupled with raw image sources like sensors.

20 Claims, 14 Drawing Sheets

(56) References Cited

OTHER PUBLICATIONS

R. Hess, "An Open Source SIFT Library", ACM Proc. of the Int. Conference on Multimedia (MM), Florence (Italy) 2010, http://robwhess.github.io/opensift/.

K. Mizuno et al., "A Low-Power Real-Time SIFT Descriptor Generation Engine for Full HDTV Video Recognition", IEICE Trans. Electron, vol. E94-C, No. 4, Apr. 2011, pp. 448-457.

V. Bonato et al, "A Parallel Hardware Architecture for Scale and Rotation Invariant Feature Detection", IEEE Trans. on Circuits and Systems for Video Tech., vol. 18, No. 12, Dec. 2008, pp. 1703-1712.

E. O'Shea, "Bachet's problem: as few weights to weigh them all", arXiv:1010.5486v1 [math.HO], Oct. 26, 2010, pp. 1-15.

S.K. Park, "The r-complete partitions", Discrete Mathematics, 183 (1998), pp. 293-297.

S. Huang, "High-Performance SIFT Hardware Accelerator for Real-Time Image Feature Extraction", IEEE Trans. on Circuits and Systems for Video Tech., vol. 22, No. 3, Mar. 2012, pp. 340-351.

"Hamming distance," retrieved from http://en.wikipedia.org/wiki/Hamming_distance on Jul. 30, 2014, 3 pages.

Calonder et al., "Brief: Computing a Local Binary Descriptor Very Fast," *IEEE Transactions on Pattern Analysis and Machine Intelligence* 34(7):1281-1298, Jul. 2012.

Huggett et al., "A Dual-Conversion-Gain Video Sensor with Dewarping and Overlay on a Single Chip," IEEE International Solid-State Circuits Conference (ISSCC) 2009, Session 2—Imagers 2.8, pp. 52-54.

Rosten et al., "Faster and Better: A Machine Learning Approach to Corner Detection," *IEEE Transactions on Pattern Analysis and Machine Intelligence* 32(1):105-119, Jan. 2010.

\* cited by examiner

HARDWARE COPROCESSOR FOR STRIPE-BASED INTEREST POINT DETECTION

CROSS REFERENCE TO RELATED APPLICATION

This application claims the benefit of U.S. provisional application Ser. No. 61/637,520, filed on Apr. 24, 2012, which application is incorporated herein by reference to the maximum extent allowable by law.

TECHNICAL FIELD

This invention relates to image processing and computer vision and, more particularly, to a coprocessor for stripe-based interest point detection.

DISCUSSION OF THE RELATED ART

Recent development of methods and technologies in the computer vision area has seen growing industrial and scientific interest in Visual Search (VS), which has ranged from a component of artificial vision to a research field having its own, well-defined role. The capability to initiate search queries from an object represented in a still or moving picture has enabled a large number of applications in the field of image retrieval, such as e-commerce and entertainment, medical diagnostic, security, automotive and the like, so that several enabling methods have been proposed in the literature. Almost all the approaches proceed on the individuation and extraction of particular features from an image and their coding in order to produce a descriptor bitstream to be available for image matching and retrieval.

One of the most frequently discussed approaches is the Scale Invariant Feature Transform (SIFT) that exhibits good stability against the image modifications caused by resolution changes, affine transformations, illumination conditions and partial occlusions. Principally due to the high computational requirement of SIFT, several alternatives have been proposed like SURF, CHoG, BRIEF and others which usually achieve better speed performance, at the cost of robustness, by introducing analytical simplifications and high degrees of processing parallelism.

The plethora of proposed approaches has favored an official standardization process, as part of MPEG-7, with the purpose to analyze and collect the most effective methods to extract features from images and compactly describe them through a well-defined descriptor bitstream, in order to enable the technologies to efficiently process and transmit the features with low bandwidth requirements. Although compliance with this last requirement is very important to simplify the server apparatus for retrieval and matching of VS queries, it implies that the coding procedure must be executed locally to the clients in order to transmit the compact descriptor only with limited bitrates, contrasting, in this way, with the high computational demand to ensure the robustness of the descriptor.

In all the prior art approaches, the largest part of the computational load is due to the implementation of the scale invariant feature, generally implemented by extracting interest points (IPs) of an image from a scale-space domain, in turn obtained by blurring downsampled versions of the input image at different scales, in a way similar to edge-detection methods. The construction of this "pyramid" of downsampled/blurred images is very computation intensive. As reported by other authors and verified by the present inventors by means of the Vlfeat free software library, commonly employed for reference tests on SIFT, the filtering phase in conjunction with the interest-point detection requires about 80% of the overall pipeline.

Although other approaches concentrate on the simplification of these initial steps, the processing time generally required by software implementation running on general purpose processors is far from meeting real-time performance, even on low resolution images. This problem is highly amplified when such procedures run on resource constrained devices, e.g. in handheld devices or standalone imagers which, as a consequence, require a large part of the processing on the server side. Furthermore, the implementation of a scale-space pyramid requires a large amount of memory for frame buffering and partial data storage that would also raise the cost of the hardware implementation due to usage of costly external DRAM memories and bus controllers for standalone image signal processors (ISP).

SUMMARY OF THE INVENTION

We propose a new Application-Specific Processor (ASP) for pyramid construction and interest point detection based on Difference-of-Gaussian (DoG) filtering, which satisfies one or more of the following specifications:
1. Real-time elaboration on LUMA frames having at least VGA resolution (640×480 pixels);
2. Streaming processing on input data received from image sensors;
3. Absence of frame buffers;
4. Absence of external DRAM, substituted by a small amount of embedded SDRAM;
5. Platform independent implementation to operate with Field-Programmable Logic (FPL) as well as ASIC std_cells.

The choice of the DoG algorithm for scale-space pyramid construction is motivated by its performance when used for edge or interest point detectors, surpassed only by the Laplacian-of-Gaussian (LoG) itself, and its unique feature of using separable Gaussian filters for band-pass filtering.

Furthermore, the architecture allows processing of frames by stripes, i.e. by image portions having one dimension coincident with the image width and the other dimension arbitrarily chosen in principle, but, de facto, bounded by filter sizes.

The architecture enables VS applications not only in resource constrained portable devices, but also allows the implementation of an effective Application-Specific Image Processor (ASIP) tightly coupled with image sensors. This combination appears very attractive for automotive applications, where the availability of smart sensors, capable of reducing the operations of the central processing unit and, at the same time, reducing the transmission bitrate, allowing the use of less expensive wiring apparatus, is very appealing.

A look at the recent literature reveals that, although a design with similar features doesn't exist, some DoG implementations have been published as part of DoG+SIFT accelerators, even if the entire pipeline has not been implemented. Although these works will be used as reference for performance comparisons, the scope of our work is to provide a more general pre-processor, to be used in conjunction with SIFT as well as with other hardware or software VS algorithms, and that due to its unique features, is advantageous for VS applications in particular environments. Synthesis results targeted to FPGAs and std_cells ASIC technology demonstrate that the above specifications are largely satisfied.

According to a first aspect of the invention, an image processor comprises a first stage configured to receive pixels from an image source, the first stage including a plurality of octave elements, each octave element including an octave module and a synchronization buffer to provide pixels to the octave module, wherein the octave module is configured to generate several Difference-of-Gaussian images; and a second stage including interest point detectors configured to receive the Difference-of-Gaussian images from respective octave modules and to generate interest point values and positions.

According to a second aspect of the invention, a method for image processing comprises receiving, by a first stage, pixel data from an image source, the first stage including a plurality of octave elements each configured to generate several Difference-of-Gaussian images; and processing, by a second stage, the Difference-of-Gaussian images from respective octave elements and detecting interest point values and positions.

DETAILED DESCRIPTION

Implemented Algorithms

The proposed coprocessor performs all the interest point detection, including the DoG pyramid creation and local extrema detection. In the following sub-sections, a brief description of the underlying algorithms is provided.
Difference-of-Gaussian (DoG) Pyramid Difference-of-Gaussian (DoG) is a band-pass filtering operator obtained by calculating the difference, point-by-point, of two low-pass filtered (blurred) versions of the same grayscale image, each obtained by convolving the image with two bi-dimensional Gaussian filters having different radii:

$$DoG(x, y, \sigma) = L(x, y, k\sigma) - L(x, y, \sigma) \quad (1)$$
$$= G(x, y, k\sigma) * I(x, y) -$$
$$G(x, y, \sigma) * I(x, y)$$

where $$G(x, y, \sigma) = \frac{1}{2\pi\sigma^2} e^{-\frac{x^2+y^2}{2\sigma^2}},$$

I(x,y) is the input image, k∈R and "*" is the convolution operator.

It can be demonstrated that the DoG filter, with its typical Mexican hat transfer curve is an approximation of the well-known scale-normalized Laplacian-of-Gaussian (LoG), employed for edge detection problems. The DoG operator is the initial step of several image detection algorithms, where it is generally preferred to LoG for its more effective implementation allowed by the separability feature of Gaussian filters.

Considering that digital images are discrete domains, the convolutions in equation (1) can be rewritten as:

$$G(i, j, k\sigma) * I(i, j) = \sum_{m=-N}^{N} \sum_{l=-N}^{N} G(m, l) I(i-m, j-l) \quad (2)$$
$$= A \times \sum_{m=-N}^{N} \sum_{l=-N}^{N} e^{-\frac{(k^2+l^2)}{2(k\sigma)^2}} I(i-m, j-l)$$
$$= A \times \sum_{m=-N}^{N} e^{-\frac{k^2}{2(k\sigma)^2}} \left[ \sum_{l=-N}^{N} e^{-\frac{l^2}{2(k\sigma)^2}} I(i-m, j-l) \right]$$

where i, j∈N are the integer spatial coordinates of pixels. Equation (2) shows that the 2D (two-dimensional) Gaussian filter can be viewed as a combination of two 1D (one-dimensional) convolutions. Hence, to calculate the discrete scale-space, for every pixel in (i,j) it is sufficient to execute the convolution with a 1D Gaussian kernel and then convolve the result with the complementary kernel of the equivalent 2D filter. This separation drastically reduces the computational complexity from $O(n^2)$ to $O(2n)$.

Figure 1:
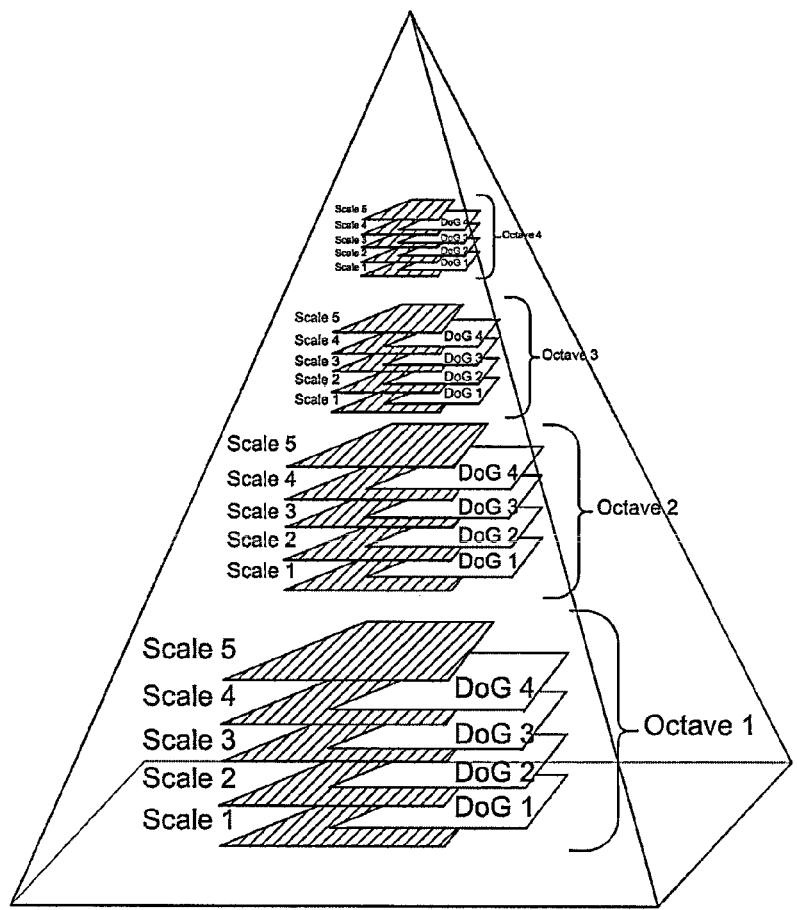
FIG. 1 is a schematic representation of the use of Difference-of-Gaussian filtering to construct a pyramid.
Figure 2:
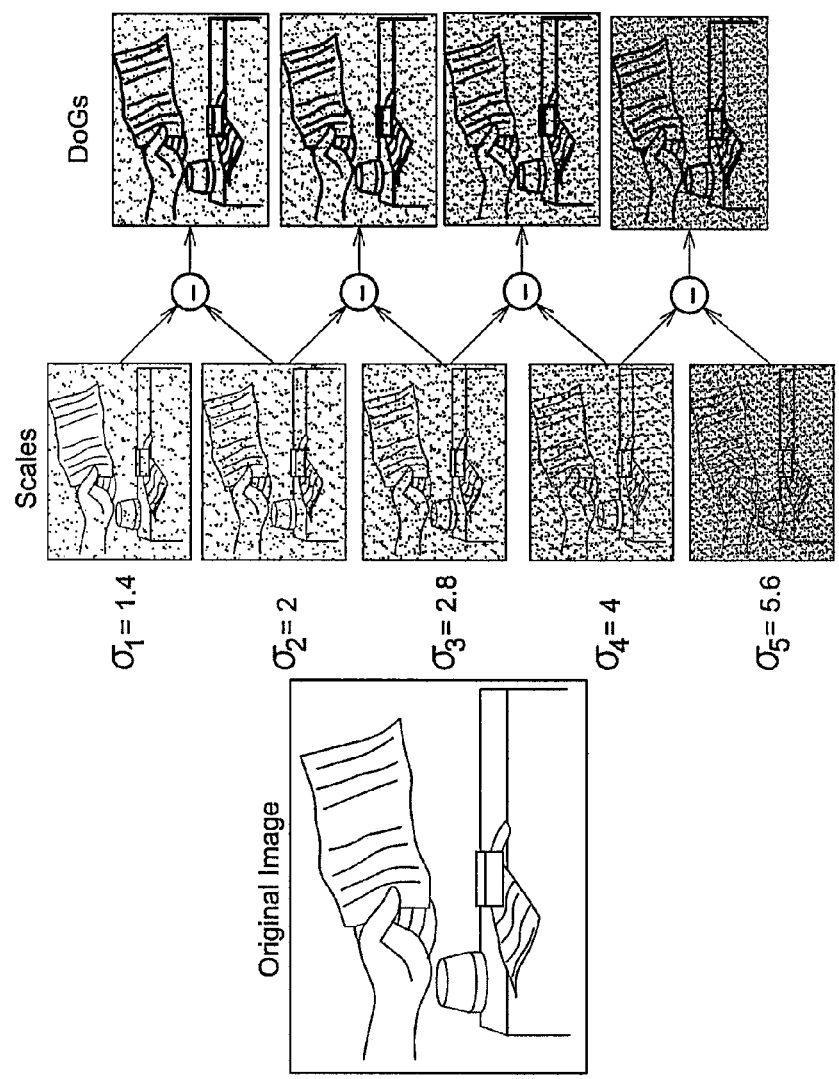
FIG. 2 illustrates an example of a Difference-of-Gaussian calculation.

The scale-space pyramid is built from equation (2) as in FIGS. 1 and 2 by:
  blurring the input images with Gaussian filters having increasing σ values, namely scales;
  calculating DoGs as in equation (1) from the blurred image with adjacent σ;
  iterating the procedure on 2× downsampled versions of the input image, namely octaves According to the established theory, the parameter k in equation (2) has been set equal to $2^{1/S}$ where S+3 represents the scale number for each octave. With the purpose of preserving HW (hardware) accuracy comparable with the software implementations and to limit the sizes of the proposed processor, we decided on S=2, which results in 5 scales for each octave, and on 4 octaves that work on downsampled images 2, 4 and 8 times smaller than the original used in the first octave. Depending on the specifications to meet and in absence of particular limitations, the scalability of the proposed design easily allows for a different dimensioning of the scale-space pyramid in order, for example, to reduce the processor size as well as improve power/speed performance.

A fundamental trade-off involves the Gaussian kernel dimensions from which depend both the accuracy and the HW complexity of the filters. Although Gaussian filters have infinite domains, a reasonable approximation consists in limiting their unilateral dimensions to 6σ+1, with σ being the standard deviation of the generic Gaussian kernel. In this way, the ratio between the median value of the Gaussian kernel and the neglected values is greater than 3 orders of magnitude, which is sufficient to preserve the filter accuracy.

Given the initial standard deviation, $\sigma_0=1.4$, the above choices result in the following scales $\sigma=\{1.4; 2; 2.8; 4; 5.6\}$ and, from these, the following filter dimensions: 9×9; 13×13; 17×17; 25×25; 35×35 for scales 1-5, respectively.

As will be shown below, a quite different choice will be made for the practical implementation of the filters, in order to simplify the synchronization of all the scales.

Even if the separation of Gaussian filters reduces the above to one-dimensional filters, the relevant dimensions of the filters require a large number of multiply-accumulator (MAC) operators to perform the convolution in equation (2). Additionally, in the prior art, as in almost all VS software, the whole DoG computing pipeline is constrained to floating-point arithmetic, 32-bit single precision IEEE-754 compliant ("FP32" hereafter). These FP32 units often require some additional logic to be used to synchronize the data path from/to the CPUs, as commonly implemented as tightly/loosely coupled coprocessors in SoCs (System on Chips). Therefore the obtained performance is much worse than what is achievable with integer-only arithmetic, in terms of both speed and code compactness. When designing custom hardware for DoG, moreover, a FP32 implementation causes the resulting designs to be huge in size and hardly finable in relatively constrained platforms. In this context, a fixed-point approach is helpful in reducing the required physical resources to obtain an effective system, with an overall advantage for the whole processing pipeline. With this purpose, tests on the prior art software have been conducted to prove the effective trade-off between the minimum number of bits required in Fixed-Point arithmetic to implement a 2D full Gaussian kernel and its 1+1D separable counterpart. Also accounting for the 2D full (non-separated) kernel, it has been proven that limited differences are obtained by coding with 10 bits the intermediate, inter-Gaussian results and with 14 bits the 2D filtered pixels of the pyramid.

Extrema Detection

Figure 3:
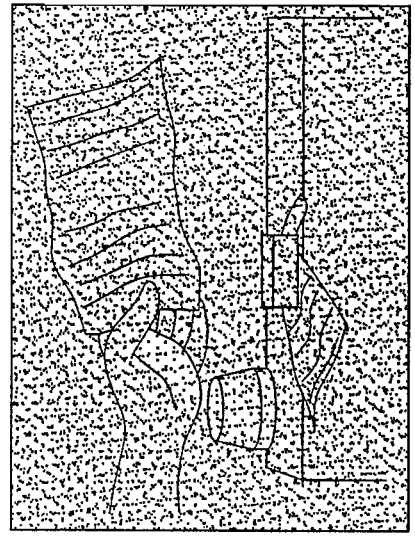
FIG. 3 is a schematic representation of interest point calculation.
Figure 3:
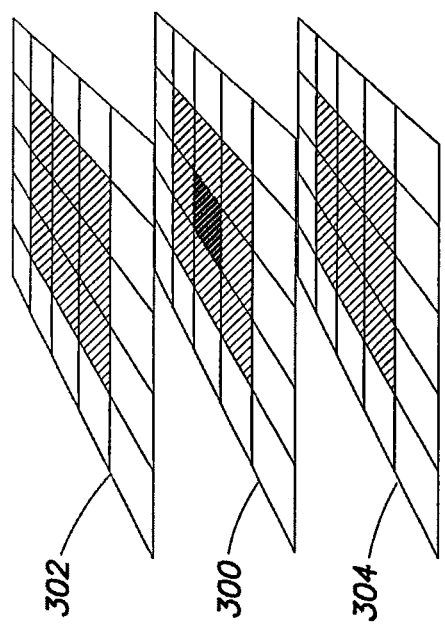

Once the DoG pyramid is available, the interest points can be identified, as shown schematically in FIG. 3, by comparing each pixel in the DoG image with its eight neighbors pixels in the same scale 300 and the corresponding nine pixels of two adjacent scales 302 and 304. If the pixel is an extremum, i.e. a maximum or a minimum, it is considered as an interest point to be successively validated. Since from the five scales, four DoGs can be calculated for each octave, the extrema detection are processed by two pipes in parallel for each octave, by comparing the first and the second groups of three DoGs respectively.

Stripe-Based Processing

Figure 4:
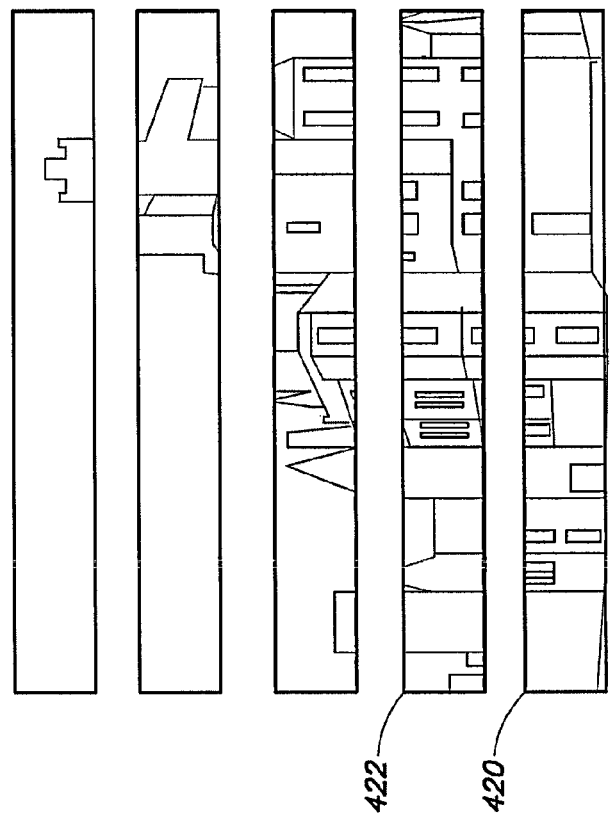
FIG. 4 is an illustration of a stripe-based algorithm.
Figure 4:
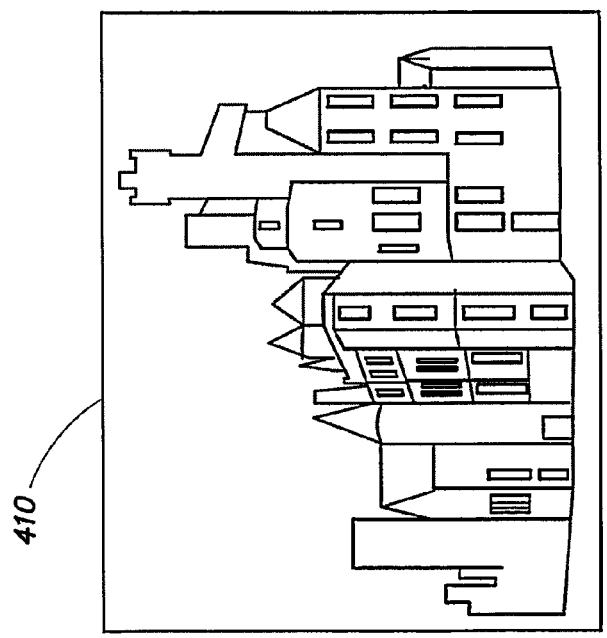

A useful consequence of the stream processing feature is the possibility of implementing a stripe-based process when small frame buffers are available. According to equation (1), the filtering operation has been defined over the whole XY plane, and more in detail on the Luma channel of the input image. Also, looking at the σ parameter valid values, it turns out that the most complex Gaussian kernel is as large as 35×35 pixels, or 35×1 pixels by using the separability property of the 2D exponential function. The total complexity of the filtering procedure is O(n) as all the scale/octave convolutions are still linear, but large enough to suggest the usage of data parallel computational structures. The principal argument against the trivial parallelization is the implicit serialization of the processing pipeline, due to the specific rule of creation of DoG Pyramid scales (third scale of n-th octave will become the input image for first scale of n+1-th octave). For this reason, it has been proven, by comparison with the original algorithm, the possibility to process a frame of generic dimensions by stripes. As shown in FIG. 4, an image 410 is processed by processing stripes 420, 422, etc. To achieve the capability of processing a generic dimension frame by stripes, some multiple copies of entire frames have to be stored during the execution in order to feed the following processing stages.

It is possible to split the filtering this way:

$$DoG(x, y, \sigma) = L(x, y, k\sigma) - L(x, y, \sigma)$$
$$= \bigcup_{s=0}^{n} G(x, y_s, k\sigma) * I(x, y_s) - G(x, y_s, \sigma) * I(x, y_s)$$
$$y_s \in \left[sh; sh + \left\lceil \frac{k\sigma}{2} \right\rceil\right]; n = \frac{H}{h}$$

where H is image height and h is the candidate block height. As usual for image processing, each stripe must account for a border region, overlapping between adjacent stripes. The $y_s$ range accounts for this overlap by including as many rows in the calculation as half of the size of the actual kernel used for the filtering plus one row, thus resulting in a minimum overlap region per scale of $\{5, 7, 9, 13, 18\}$ rows. Although under this condition all the pixels contributing to the single (x,y)-th result belong to the same slice, the accuracy of the results must be verified since approximations occur in considering a limited kernel applied to a bounded domain. This has been done by running the entire Vlfeat pipeline on several image samples. On a pure theoretical basis, no differences are to be highlighted between the frame-based DoG and the stripe-based DoG. The pixels in each domain are under one and one only stripe, while the overlap region is provided only to avoid distortion in the calculation of right-tail terms of Gaussian convolutions. Being identical, the unique image and the corresponding image obtained by union of stripes, the Gaussian differences will be exactly the same. The same argument applies to the non-maxima suppression stage. As it starts working after the DoG image is composed, no distortion is present in the input data for each pixel input to the Stage 2 module.

Even if the modularity of the architecture enables a more general block processing in the presence of a frame buffer-based process, the proposed architecture doesn't exploit the vertical subdivision in order to preserve the streaming operation. Indeed, the coprocessor has been modeled as having only raster-scan access to the image pixels, and the dataflow does not use any non-linear access to the data, thus enabling the system to work just in streaming mode.

Proposed Architecture

Figure 5:
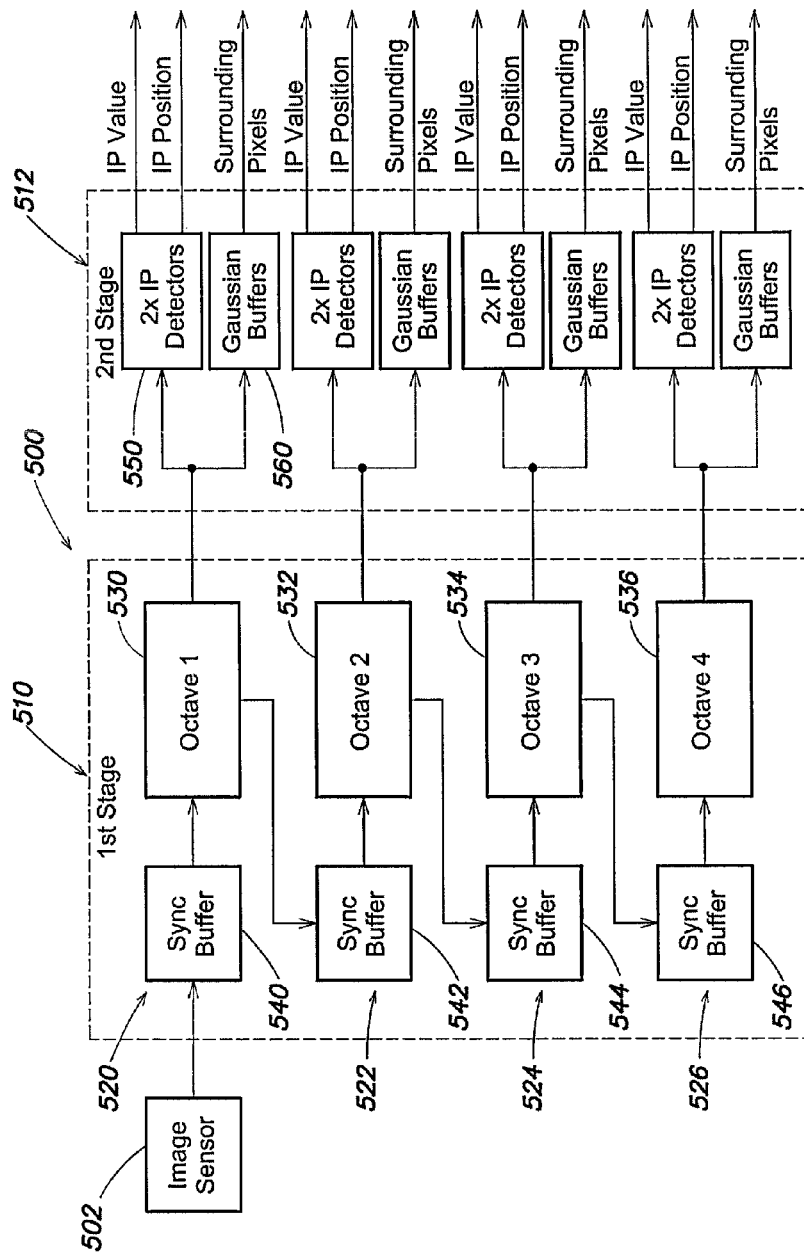
FIG. 5 is a schematic block diagram of a coprocessor architecture, in accordance with embodiments of the invention.

A schematic block diagram of the proposed processor 500 is shown in FIG. 5. It will be understood that the processor 500 can operate independently or can operate with a host processor as a coprocessor. According to the process flow, the architecture has been divided in two sequential stages: a DoG stage 510 devoted to the space-scale pyramid creation; and a IP detection stage 512 devoted to the local extrema detection. Input pixels are acquired directly from an image sensor 502 without additional caching apparatus other than that provided by the sensor itself. The coprocessor works, but is not limited to, on grayscale images whose pixels are coded by 8 bits (256 grey levels) which is sufficient for non-medical applications such as entertainment or automotive. Chroma components are rejected during the acquisition phase. The output includes the integer coordinates of the IPs coded with $n=\log_2(W)$ bits, where W is the image width dimension. The output values are sequentially provided in raster scan order, following the input processing order. Depending on what coding algorithm is used in conjunction with the proposed coprocessor, two optional buffers for each octave are added to temporarily store the Gaussian filtered pixels surrounding the detected IPs. Our implementation provides 20 row buffers for each IP, according to the requirements of SIFT.

DoG Stage

The DoG stage 510, shown schematically in FIG. 5, includes four similar octave elements 520, 522, 524, 526 connected in priority cascade order, each devoted to the processing of one octave. Each octave element includes a synchronization buffer and an octave module. Thus, octave elements 520, 522, 524 and 526 include respective octave modules 530, 532, 534 and 536, and respective synchronization buffers 540, 542, 544 and 546. This organization is a good compromise between a high degree of parallelism and resource sharing, since a favorable choice of $\sigma_3$, and the consequent bandwidth of the third Gaussian filter, allows downsampling of the blurred image from the third scale by a simple 2× decimation, avoiding any additional antialiasing filter. Hence, while the first octave element 520 receives pixels from the sensor, the next octave elements 522, 524, 526 acquire pixels from the third Gaussian filter of the preceding octave module, decimated by alternatively rejecting one column and one row. It follows that the architectural differences between the four octave elements resides in the capability of filtering images with different dimensions. According to the specification cited above, the first element 520 processes at least 640×480 pixels, the second element 522 processes 320×240 pixels, the third element 524 processes 160×120 pixels and the fourth element 526 processes 80×60 pixels.

As further shown in FIG. 5, the IP detection stage 510 includes IP detectors and Gaussian buffers which receive DoG images from respective octave elements of the DoG stage 510. Thus, for example, IP detector 550 and Gaussian buffer 560 receive DoG images from octave element 520 of the DoG stage 510.

Figure 6:
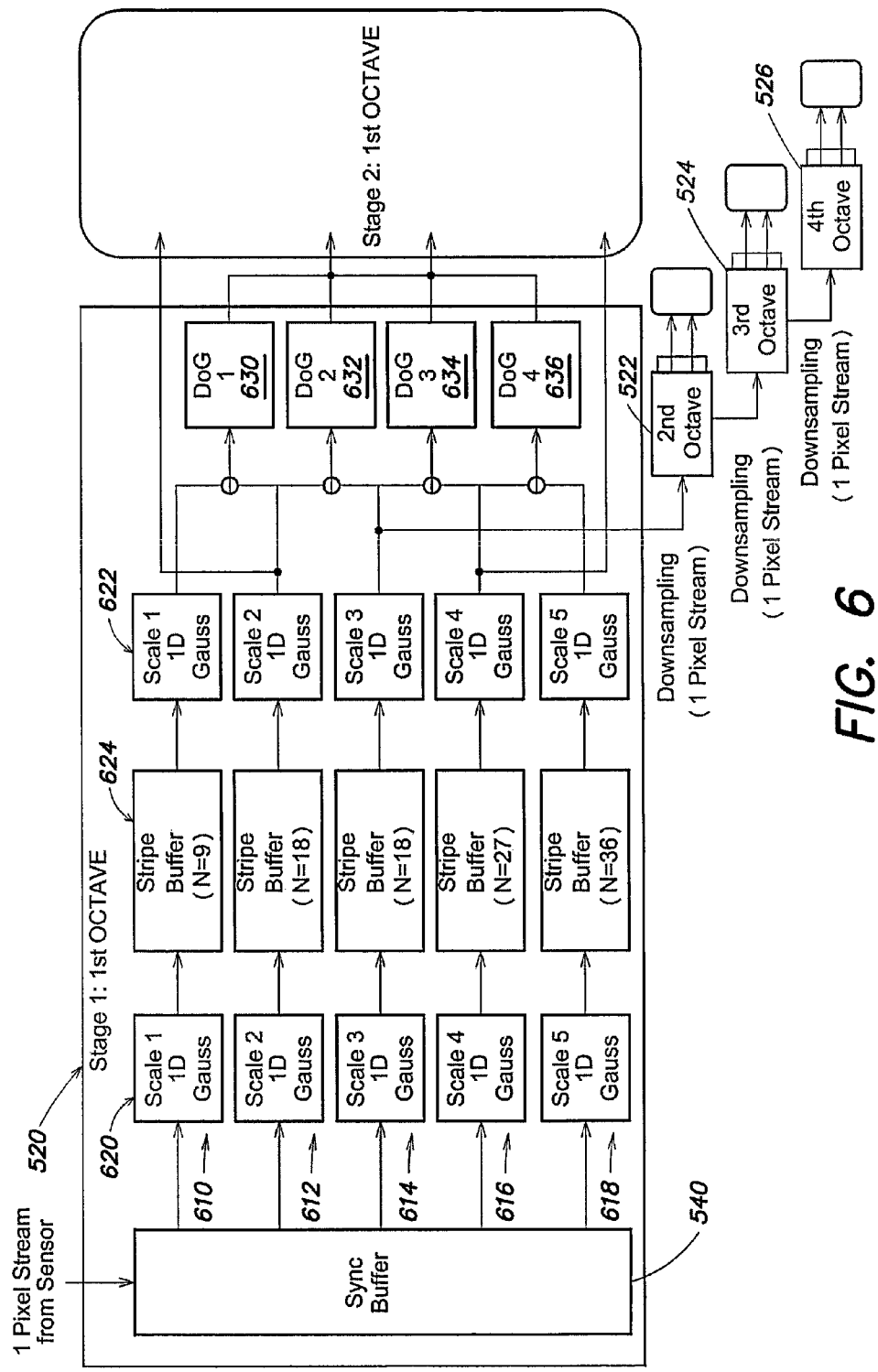
FIG. 6 is a schematic block diagram of an octave module used in the coprocessor of FIG. 5, in accordance with embodiments of the invention.

All the five scales in an octave module are processed in parallel by scale sub-modules 610, 612, 614, 616, 618 as shown in FIG. 6. Each of the sub-modules includes two sequential one-dimensional (1D) filters, in order to exploit the separability of the bi-dimensional (2D) Gaussian filter, and a stripe buffer is coupled between filters to store partially filtered results. For example, scale sub-module 610 includes Gaussian filter 620, Gaussian filter 622 and stripe buffer 624.

Figure 7:
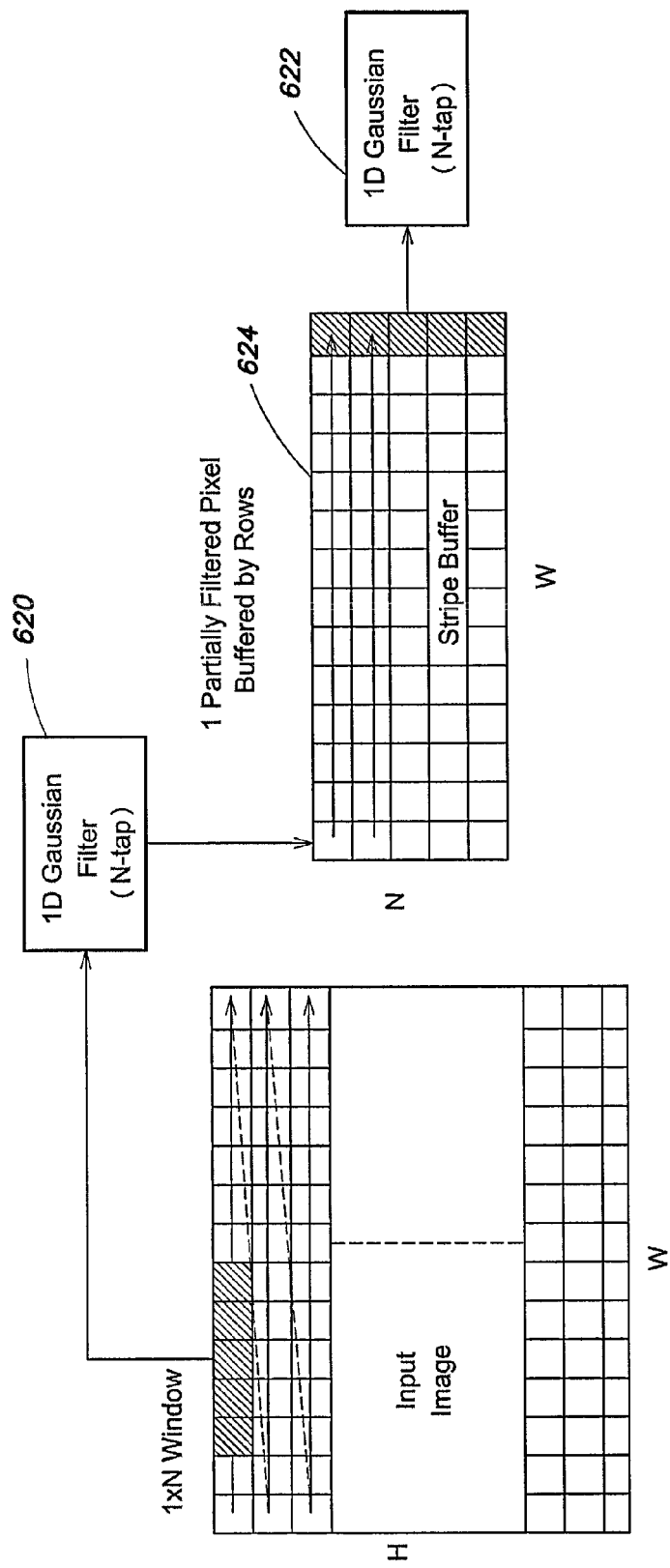
FIG. 7 is a schematic representation of Gaussian filtering, using two sequential one-dimensional filters.

According to the input stream, the processing proceeds by rows as shown schematically in FIG. 7. N pixels from the image source are collected and processed by all the scales of the first octave module 520. To preserve the streaming order, each 1D filtered pixel is stored in the stripe buffer 624 starting from the first position of the first row and then shifted into the next positions as the subsequent pixels are filtered. Since the stripe buffer 624 has the same width, W, as the frame being processed, when N rows have been 1D filtered, the N×W buffer is filled and the second 1D Gaussian filter 622 is enabled to complete the bi-dimensional filtering by iteratively accessing by column the stripe buffer 624. The parallel operation of all scales allows DoG sub-modules 630, 632, 634, 636 to directly subtract results from adjacent scales in order to calculate the relative DoG pixels and send them to the second stage without any additional buffer memory as shown in FIG. 6.

Figure 8:
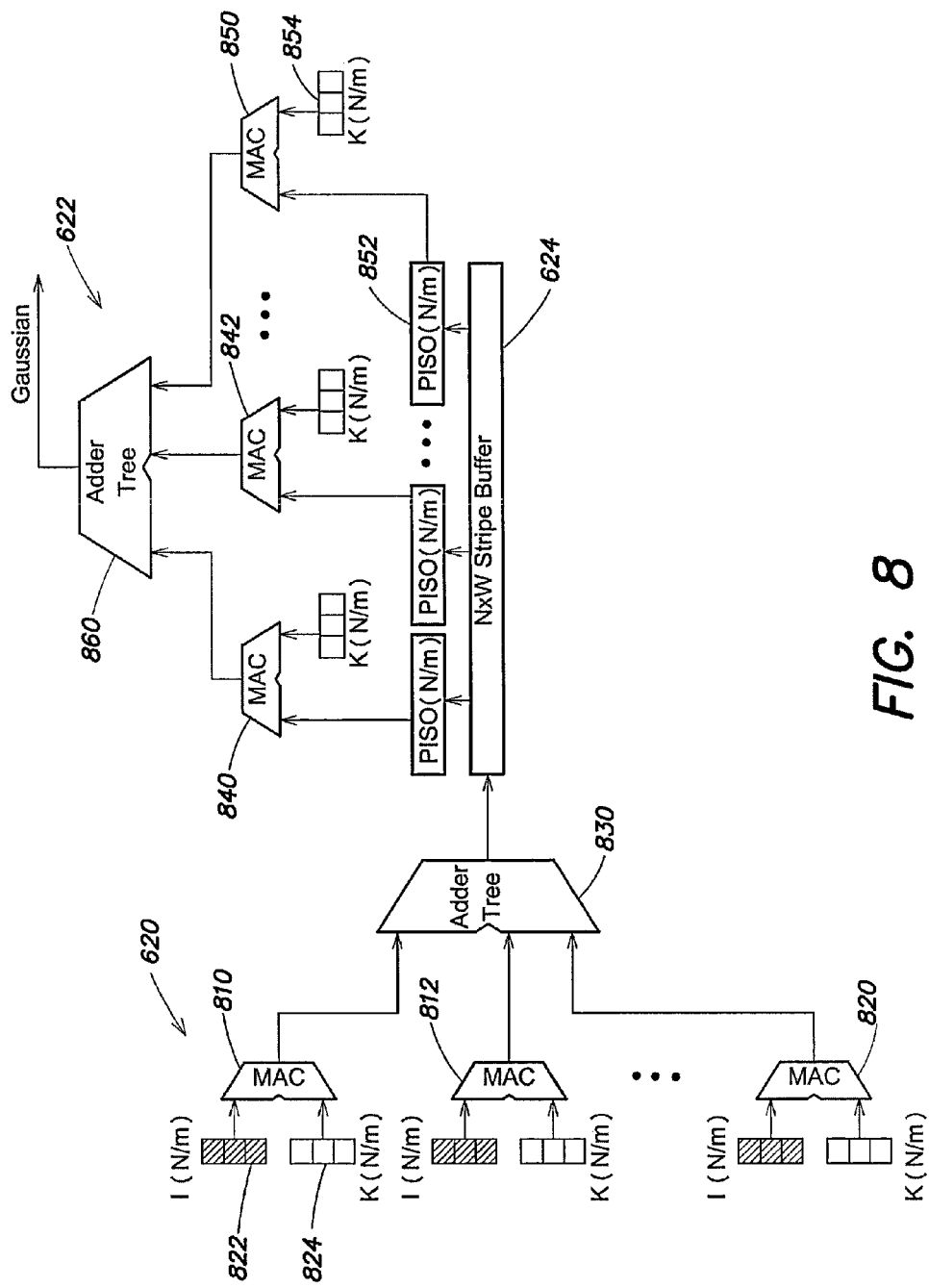
FIG. 8 is a schematic block diagram of a scale sub-module used in the octave module of FIG. 6, in accordance with embodiments of the invention.

A scale sub-module is shown schematically in FIG. 8. Gaussian filter 620 includes MACs 810, 812, . . . 820 providing outputs to an adder tree 830. The MAC 810 receives inputs from an input pixel register 822 of dimension N/m and a Gaussian coefficient register 824 of dimension N/m. The adder tree 830 provides an output to stripe buffer 624. Gaussian filter 822 includes MACs 840, 842, . . . 850 providing outputs to an adder tree 860. The MAC 840 receives inputs from a parallel-in, serial out register 852 and a Gaussian coefficient register 854. Adder tree 860 provides an output of the scale sub-module. For the first scale sub-module 610, N=9 and m=1; for the second scale sub-module 612, and the third scale sub-module 614, N=18 and m=2; for the fourth scale sub-module 616, N=27 and m=3; and for the fifth scale sub-module 618, N=36 and m=4.

Considering the kernel dimensions, the parallel filtering of all the scales would require 198 MACs (Multiply-Accumulators) for each octave, and 792 MACs for all the scales and octaves. Even if their complexity has been highly reduced by the fixed point coding adopted for the intermediate results, their number is prohibitive for a platform independent processor to be utilized also in FPL (Field Programmable Logic). A good compromise between speed and area has been obtained by a partial serialization of the Gaussian filters. The kernel dimension of the first scale (K=9) has been adopted as a basic serialization unit; which means that 9 pixels are buffered and convoluted in series by using one MAC. In order to synchronize the operation of all the scales and to preserve a high accuracy, the dimensions of larger kernels have been slightly increased to make them multiples of 9: the second filter has been enlarged from K=13 to K=18, the third from K=17 to K=18, the fourth from K=25 to K=27 and the fifth from K=35 to K=36. It follows that, as shown in FIG. 7, the second and the third filters employ two parallel working MACs, three MACs are employed in the fourth filter and four MACs are employed in the fifth filter. Considering that the second Gaussian stage has the same structure as the first, this solution allows the number of MACs to be reduced to 96 in total, which makes the design synthesizable even in medium complexity FPL platforms, as will be shown below.

With respect to a massive parallel filtering allowed by 792 MACs, the extra delay introduced by the serialization is partially compensated by shorter adder trees. In the worst case, represented by the largest filter (K=36), a parallel filtering would require six-level adder trees to complete the convolution, and seven clock cycles in total by assuming one cycle for both the multiplication and sum. Our choice requires two-level adder trees that, together with the nine cycles for MACs, increases the delay by a factor 1.6, equivalent to 11 clock cycles. Our choice represents a compromise that can be modified depending on the particular specifications oriented, for example, to better performance and, hence, to increment the degree of parallelism of the filter, as well as to further reduce the employed resources. The Gaussian coefficients are stored in small ROMs accessed in circular sequence such that each pixel is multiplied by its corresponding coefficient.

Stripe Buffer

Figure 9:
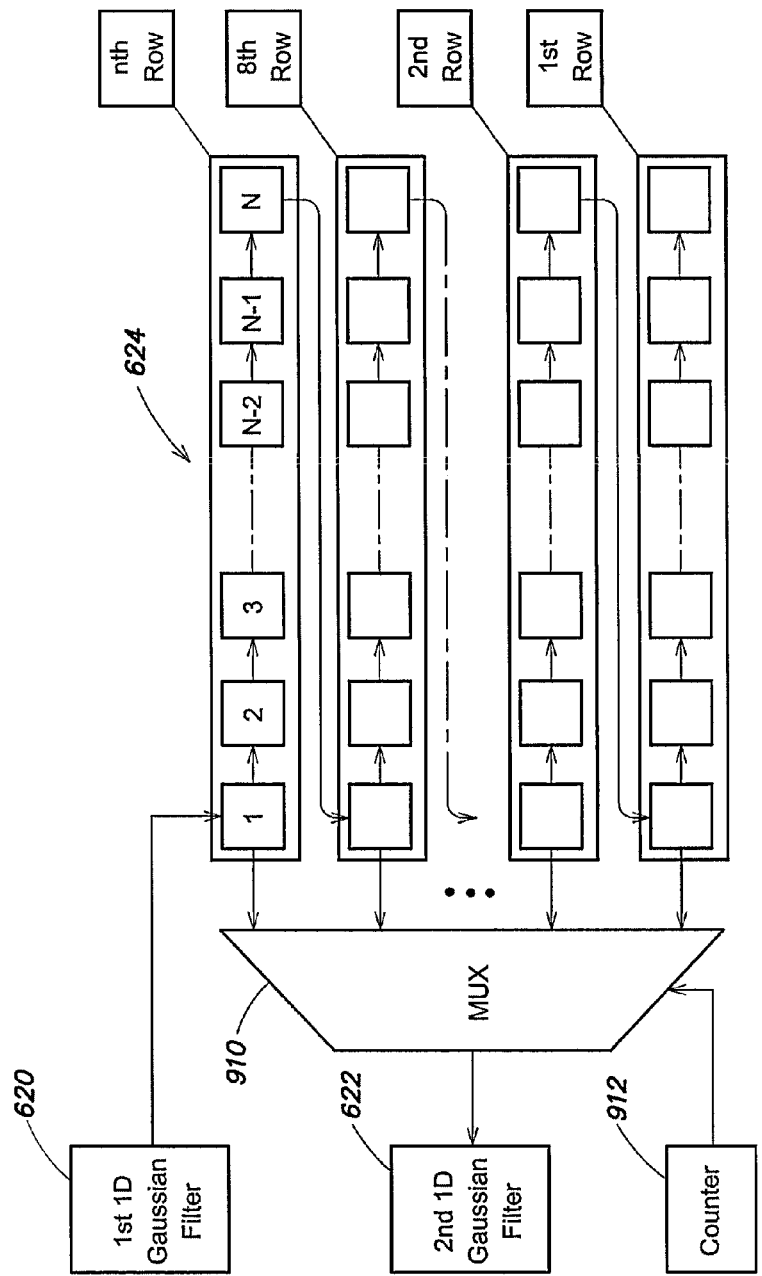
FIG. 9 is a schematic block diagram that illustrates operation of the stripe buffer shown in FIG. 8, in accordance with embodiments of the invention.

The operating principle of the stripe buffer is shown schematically in FIG. 9. The stripe buffer 624 functions as a long SIPO (Serial-In Parallel-Output) buffer which serially stores the 1D filtered rows and outputs a N-dimensional column of partially filtered data as shown in FIG. 7. The buffer structure is organized as a N×W shift register, folded as shown in FIG. 9, which continuously aligns the N data of the output column each time a new value in queued. Since the second Gaussian filter 622 has the same structure as the first Gaussian filter 620, the partial serialization of the convolution is implemented by an output multiplexer 910 giving N/9 values per clock cycle. Alternatively a PISO (Parallel-In Serial-Output) buffer can be used in place of the multiplexer to construct a translator in conjunction with the SIPO buffer, but the first solution significantly reduces the occupied area for the lower number of registers.

Although a straightforward implementation of the scheme in FIG. 9 using registers is technically possible, it is not preferred due to the large amount of physical resources required. For example, with reference to a VGA image (W=640), the stripe of the largest kernel (K=36) would store 640×36=23040 partial values, each coded with 10 bits, corresponding to 225 kbits. Accounting also for the other buffers in all the scales and octaves, this quantity increases by a factor of six, thereby increasing the power dissipation and making the routing of the processor too congested to be correctly synthesized even in large FPLs. A more suitable solution utilizes SRAM to "simulate" the SIPO behavior of the buffer. Given the availability of embedded SRAM modules both in std_cell technology and FPLs, this solution enables the implementation of the processor in both kinds of target platforms.

Figure 10:
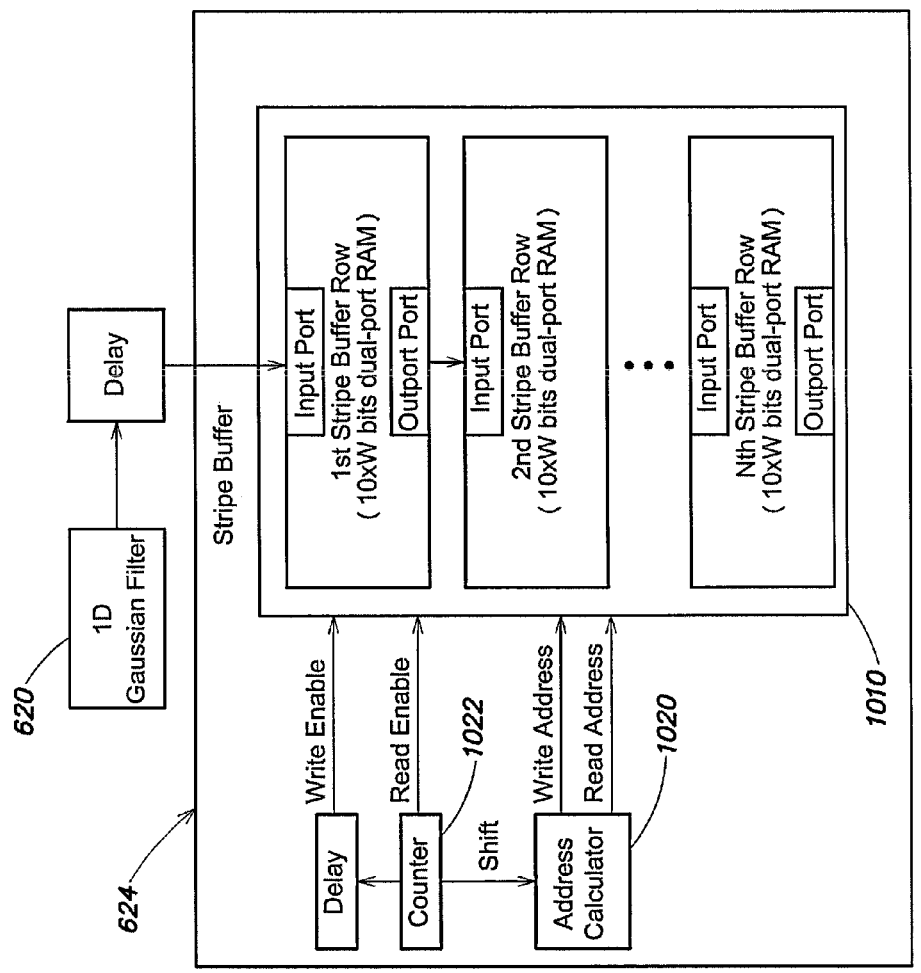
FIG. 10 is a schematic block diagram an SRAM-based architecture of the stripe buffer, in accordance with embodiments of the invention.

The SRAM-based architecture is shown schematically in FIG. 10. In order to implement the long shift register shown in FIG. 9, and hence to enable the writing of an input data and the reading of an output data value during the same clock cycle, each row of the stripe buffer has been implemented by a dual-port SRAM 1010 of appropriate dimensions to store an entire frame row. Read and write addresses are generated contemporarily by the address-calculator module 1020 at regular intervals determined by a shift signal generated by a counter 1022, which also avoids timing violations by enabling the reading phase at the positive edge of the clock and the writing at the negative edge. The SRAM dimensions are chosen according to the largest width of the images to be processed. A limitation when using SRAM in non ASIC implementation resides in the difficulty of perfectly matching the required dimensions. Since embedded FPL are provided with SRAM modules having few configuration capabilities, the memory utilization usually exceeds the minimum required, with detrimental effects on power/area performance. In turn, the use of a SRAM implementation for stripe buffers facilitates the extension of the architecture to the processing of images with different resolutions by simply extending the addressing space of memory modules and, eventually, their dimensions. As a final consideration, the proposed solution is advantageous in terms of total memory requirement with respect to a frame buffer-based implementation. Indeed, considering that the stripe buffer heights must be chosen according to the filter dimensions, it follows that any octave module requires 108 rows in total against 480 rows of a VGA image buffer which scales proportionally to the image size. The same proportion applies for all the octave modules.

Synchronization Buffer

Figure 11:
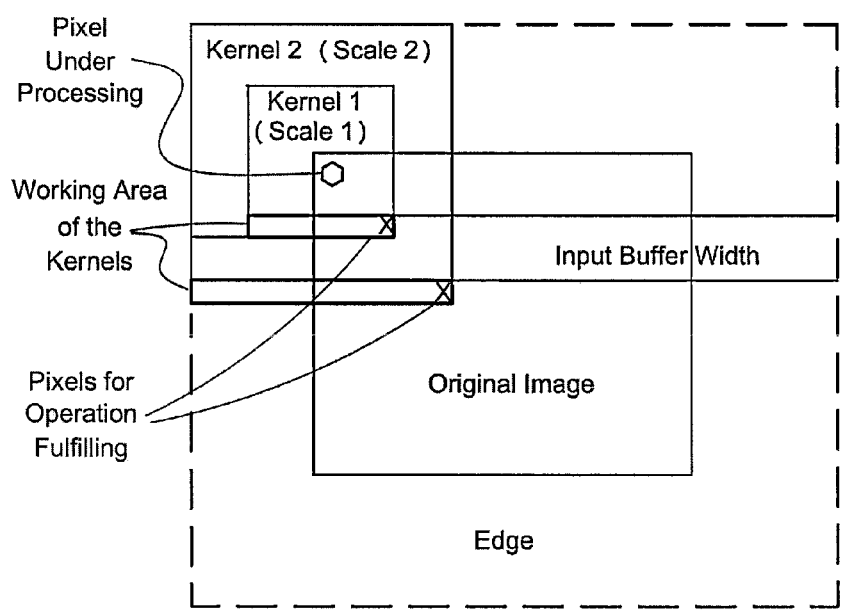
FIG. 11 is a schematic representation of a misalignment between stripe buffers of different sizes.

A synchronization problem is due to the misaligned filling of the stripe buffers from different scales caused by their different sizes. This problem is shown schematically in FIG. 11, where the operation of a hypothetical 7×7 and 13×13 Gaussian kernel is represented. The pixels indicated by X are the last needed to complete the filtering of the pixel at the center of the filter window. In a normal raster-scan order, the smaller stripe buffer saturates while the largest buffer is still partially empty. It follows that the smaller filter completes the processing before the largest filter, thus causing a misalignment of the input to the DoG subtractors. Additionally, to preserve the capability of streaming processing, it is impossible to stop or slow down the processing of the smaller filter, which would cause the loss of the incoming values.

Figure 12:
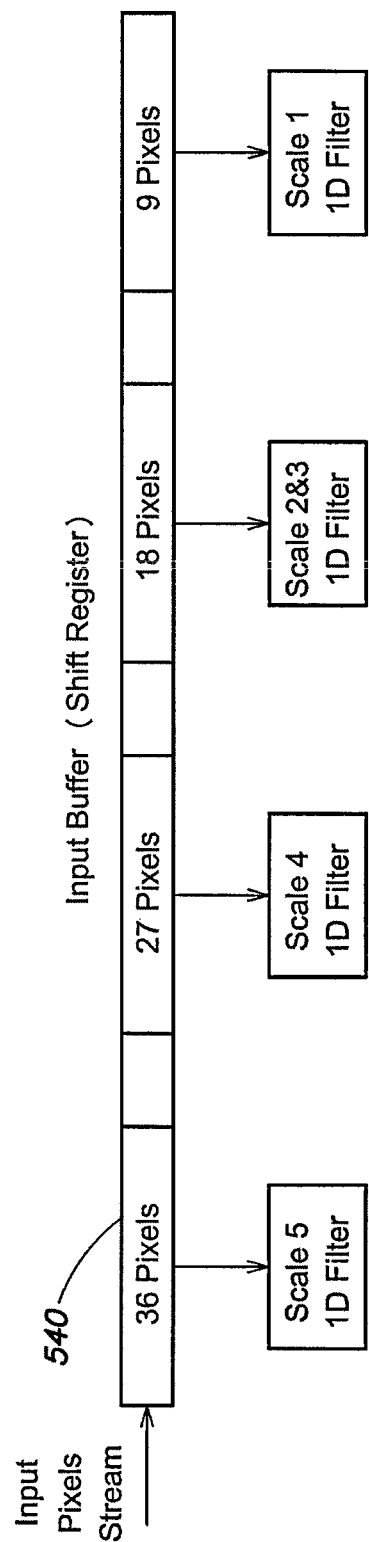
FIG. 12 is a schematic block diagram of a serial-in, parallel out implementation of the synchronization buffer.

In order to ensure the same time of arrival for both X pixels, a synchronization buffer for each octave module delays the beginning of the smaller filter operations. As shown schematically in FIG. 12, a synchronization buffer 1210 has been implemented by a SIPO register, whose length is 13 rows+22 pixels, for the choice of the filter dimensions. Considering that the input pixels are coded with 8 bits, the buffer dimensions for VGA images is 65 kbits for the first octave and, accounting for the downsampling, 122 kbits for all the four octaves.

Second Stage

Figure 13:
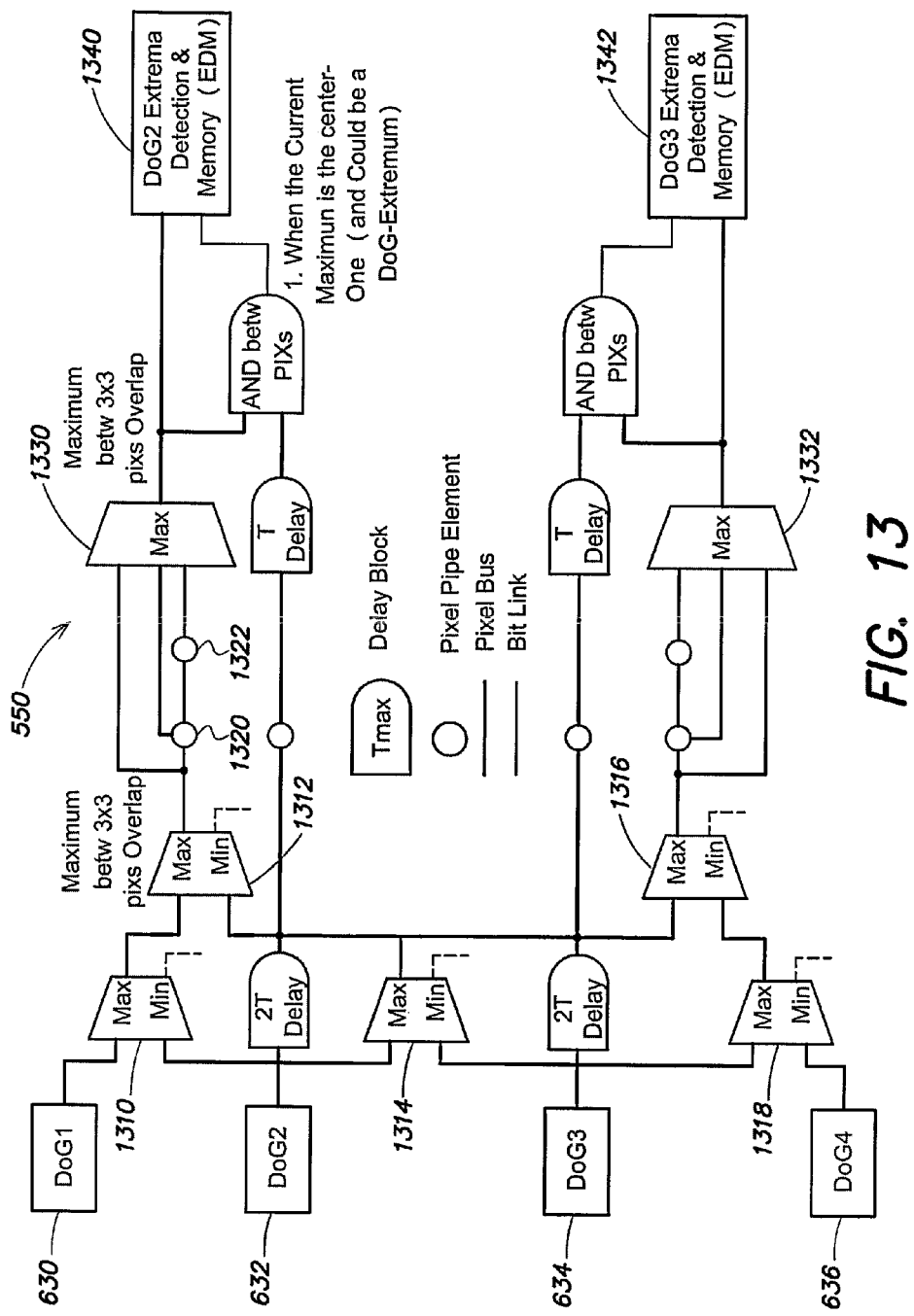
FIG. 13 is a schematic block diagram of the second stage of the coprocessor of FIG. 5, in accordance with embodiments of the invention.

Pixels of the DoG pyramid are read in streaming order from the second stage 512, whose architecture is shown in FIG. 13. Pixels at the same abscissa of adjacent DoG sub-modules are compared by a two-level comparator tree, including comparators 1310, 1312, 1314, 1316 and 1318, in order to determine the local extremum. This value is pushed in a two-stage pipeline 1320, 1322 and is compared by comparators 1330, 1332 with the two incoming values to determine the extremum between the 9 pixels of one row on three adjacent DoG sub-modules. The second pixel of each triple from the central DoG sub-module, adequately delayed, is compared with the resulting extremum in order to set a flag bit if it occupies the central position. Resulting extrema from the first two rows plus the central flag are stored in two buffers whose lengths are equal to the maximum number of maxima (minima) that a row can contain (half of a row in the worst case of a chequed image) and whose width is equal to the pixel resolution incremented by one flag bit. The extrema from the third row are compared on their arrival with that from the preceding two in order to complete the comparison shown in FIG. 3. From this point, the procedure continues to the end of the frame one row at a time.

Figure 14:
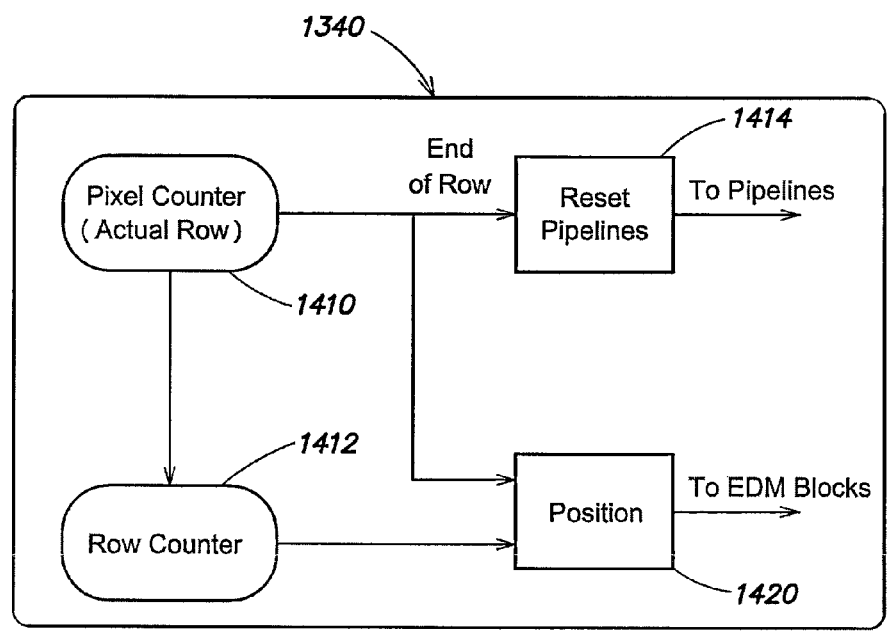
FIG. 14 is a schematic block diagram of the extrema detector shown in FIG. 13, in accordance with embodiments of the invention.

The same circuitry is replicated for all the DoG triples in an octave and for all the octaves, two times for each octave in our case and eight times in total. The position of the extrema are obtained from the scheme of FIG. 14, essentially including a row and a column counter 1410, 1412 and an auxiliary circuitry 1414 to reset the comparison pipes in FIG. 12. If needed by the subsequent stages, locations of the extrema are stored in position buffers 1420. Such buffers are accurately dimensioned, since the number of the IPs is not known a priori. Experiments on sample images return a medium value of 2600 IPs for VGA images, whose distribution among the octaves is as follows:

More than 85% in Octave 1 (of which 75% in the first DoG comparisons)
5%-15% in Octave 2
5%-10% in Octave 3
0%-3% in Octave 4

According to the above values, oversized position buffers have been implemented for each extrema detector sub-module, having the following dimensions:

Octave 1: 2000 for detector 1; 1000 for detector 2
Octave 2: 400 for both detectors
Octave 3: 150 for both detectors
Octave 4: 50 for both detectors Synthesis and Results The proposed design, configured for the processing of VGA images, has been synthesized in FPL and std_cell ASIC. Some models of Virtex 5 and 7 from Xilinx, chosen by accounting for the available resources, have been taken as representative of medium and high-end FPL platforms. Synthesis and simulation tools from Mentor Graphics have been used to obtain uniform results on platforms from different manufacturers, while Synopsys tools have been used for the std_cell implementation based on the STMicroelectronics 28 nm CMOS technology.

Based on the importance of the memory on the overall area, on the basis of the coding lengths in Tab. I, the total memory requirements of the proposed processor have been reported in Tab. II, detailed for each sub-module of the processor. For generality, all the values have been parameterized by the image frame width, W, while the third column reports the absolute quantities required for VGA image processing.

| Module | Generic Memory Requirements (bits) | VGA memory requirements (kbits) |
| --- | --- | --- |
| $1^{st}$ Stage Stripe Buffers Total: 1.24 Mbits | 1080* W for $1^{st}$ octave; 540* W for $2^{nd}$ octave; 270* W for $3^{rd}$ octave; 135* W for $4^{th}$ octave; | 675 for $1^{st}$ octave; 338 for $2^{nd}$ octave; 169 for $3^{rd}$ octave; 85 for $4^{th}$ octave; |
| $1^{st}$ Stage sync buffers (13 rows + 22 pels) Total: 122 kbits | 104* W + 176 for $1^{st}$ octave 104* W/2 + 176 for $2^{nd}$ octave 104* W/4 + 176 for $3^{rd}$ octave 104* W/8 + 176 for $4^{th}$ octave | 65 for 1° octave 32.5 for 2° octave 16.3 for 3° octave 8.1 for 4° octave |
| $2^{nd}$ Stage extrema surrounding buffer (20 rows) Total: 657 kbits | 560* W for $1^{st}$ octave 560* W/2 for $2^{nd}$ octave 560* W/4 for $3^{rd}$ octave 560* W/8 for $4^{th}$ octave | 350 for 1° octave 175 for 2° octave 88 for 3° octave 44 for 4° octave |
| $3^{rd}$ Stage Hessian and position refinement Total: 460 kbits | 392* W for $1^{st}$ octave 392* W/2 for $2^{nd}$ octave 392* W/4 for $3^{rd}$ octave 392* W/8 for $4^{th}$ octave | 245 for $1^{st}$ octave 123 for $2^{nd}$ octave 61 for $3^{rd}$ octave 31 for $4^{th}$ octave |
| Total Memory Requirement | 4014* W | 2.45 Mbits |

Considering that the coprocessor doesn't employ external frame buffers, that reported in Tab. II represents the total amount of memory required by the coprocessor, resulting in 4014*W bits, i.e. 2.45 Mbits for a VGA processor. As expected, about half the total memory is devoted to the patch buffers of the first stage, which must be necessarily implemented by RAM. In turn, other smaller modules, like the input sync buffers, can be implemented by faster, larger registers, depending on the area/speed specifications. The quantities in Tab. II don't account for the extrema position memories, whose employment and dimensioning depends on the adjunctive utilization stage. According to the experimental tests discussed above, such buffers would require additional 334 kbits, thus increasing the total amount of memory to 2.77 Mbits. Considering that the processor requires 432 dual-port BRAM modules to implement the rows of the DoG's stripe-buffers, and that the Xilinx FPGAs are equipped with embedded memory modules configurable to be 18 or 36 kbits, the only Virtex 5 capable of accommodating the processor is the top XCV5LX330, equipped with 576×18 kbits BRAMs modules. Distributed RAMs are also usable but their use drastically reduces the overall speed performance of the system and makes the place&route phase difficult. Because of the predefined dimensions of BRAMs, the total amount of allocated memory in the above FPGA increases to 418×18 kbits plus 24×36 kbits, i.e. 8.19 Mbits. In turn, all the models of the Virtex 7 FPGA family are capable of fitting the processor, even with different performance given the quantity of feedthrough cells for routing.

In terms of performance, the datapath of the proposed coprocessor exhibits a maximum operating frequency of 105 MHz, i.e. 9.52 ns when implemented on a Xilinx Virtex 7 XC7V450T, 41% of which are for logic processing and 59% for routing.

Accounting also for the input/output delay offset, the minimum clock period increases to 12.340 ns, but this value strongly depends on the specific platform due to the differences in the fabric complexity and the related floorplanning.

With this frequency of operation, the coprocessor, in its current configuration, is capable of providing, at steady state, one filtered pixel every 11 clock cycles, which means 32 ms to process an entire VGA frame. The initial latency, due to the filling of the largest stripe buffer is 2.3 ms. Note that since these results have been obtained without an embedded DSP element, they are easily reproducible on different FPL platforms. When the processor is implemented in STM CMOS 28 nm technology, the area requirement results in 3.2 mm$^2$ and the maximum frequency achievable is 330 MHz, which means 10 ms to processes a VGA frame that readily meets the real-time specifications, even on larger frames. The above results confirm the validity of the proposed solution in a wide range of applications.

Having thus described at least one illustrative embodiment of the invention, various alterations, modifications and improvements will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An image processor, comprising:
   a first stage configured to receive pixels from an image source, the first stage including a plurality of octave elements, each octave element including an octave module and a synchronization buffer to provide pixels to the octave module, wherein the octave module is configured to generate several Difference-of-Gaussian images; and
   a second stage including interest point detectors configured to receive the Difference-of-Gaussian images from respective octave modules and to generate interest point values and positions, wherein:
   each octave module comprises scale sub-modules that receive pixel data from the synchronization buffer and Difference-of-Gaussian subtractors which receive blurred image data from adjacent scale sub-modules, and
   each scale sub-module includes a first Gaussian filter, a second Gaussian filter and a stripe buffer coupled between the first and second Gaussian filters.

2. An image processor as defined in claim 1, wherein the synchronization buffer of the first octave element receives input pixel data from an image sensor and wherein the synchronization buffer of each octave element following the first octave element receives pixel data from a previous octave module.

3. An image processor as defined in claim 1 wherein the first Gaussian filter comprises a plurality of multiplier accumulators configured to multiply pixel data by Gaussian coefficients, and an adder tree configured to add outputs of the multiplier accumulators and to provide a result to the stripe buffer.

4. An image processor as defined in claim 1 wherein the second Gaussian filter comprises parallel-in serial-out buffers configured to receive pixel data from the stripe buffer, multiplier accumulators configured to multiply outputs of the parallel-in serial-out buffers by Gaussian coefficients, and an adder tree configured to sum the outputs of the multiplier accumulators and to provide a Gaussian result.

5. An image processor as defined in claim 1 wherein the stripe buffer includes a multiplexer configured to receive outputs of rows of the stripe buffer and to provide an output to the second Gaussian filter.

6. An image processor as defined in claim 1 wherein the stripe buffer comprises a dual port Random Access Memory.

7. An image processor as defined in claim 1 wherein each synchronization buffer includes delays configured to compensate for different processing times of the scale sub-modules.

8. An image processor as defined in claim 1, wherein the interest point detectors include comparators configured to compare pixel data corresponding to adjacent pixels and delay elements configured to delay pixel data for comparison.

9. An image processor as defined in claim 8, wherein the second stage further includes interest point position circuits configured to provide interest point position data.

10. A method, comprising:
   receiving, by a first stage of an image processor, pixel data from an image source, the first stage including a plurality of octave elements, each octave element including an octave module and a synchronization buffer to provide pixels to the octave module, wherein the octave module is configured to generate several Difference-of-Gaussian images; and
   processing, by a second stage of the image processor including interest point detectors, the Difference-of-Gaussian images from respective octave elements, the processing including generating interest point values and positions, wherein
      each octave module comprises scale sub-modules that receive pixel data from the synchronization buffer and Difference-of-Gaussian subtractors which receive blurred image data from adjacent scale sub-modules, and
      each scale sub-module includes a first Gaussian filter, a second Gaussian filter and a stripe buffer coupled between the first and second Gaussian filters.

11. The method of claim 10, comprising:
   compensating for different processing times of the scale sub-modules.

12. The method of claim 10, comprising:
   comparing pixel data corresponding to adjacent pixels and delaying pixel data for comparison.

13. A system, comprising:
   a plurality of octave elements configured to receive image pixels from an image source, the first stage including a plurality of octave elements, each octave element including an octave module and a synchronization buffer to provide pixels to the octave module, wherein the octave module is configured to generate several Difference-of-Gaussian images; and
   a plurality of interest point detectors configured to receive the Difference-of-Gaussian images from respective octave modules and to generate interest point values and positions, wherein:
      each octave module comprises scale sub-modules configured to receive pixel data from the synchronization buffer and Difference-of-Gaussian subtractors configured to receive blurred image data from adjacent scale sub-modules, and
      each scale sub-module includes a first Gaussian filter, a second Gaussian filter and a stripe buffer coupled between the first and second Gaussian filters.

14. The system of claim 13, comprising:
   an image sensor, wherein the synchronization buffer of the first octave element receives input pixel data from the image sensor and the synchronization buffer of each octave element following the first octave element receives pixel data from a previous octave module.

15. The system of claim 13, comprising:
   an image processor including the plurality of octave elements and the plurality of interest point detectors; and
   an image sensor.

16. The system of claim 13 wherein the first Gaussian filter comprises a plurality of multiplier accumulators configured to multiply pixel data by Gaussian coefficients, and an adder tree configured to add outputs of the multiplier accumulators and to provide a result to the stripe buffer.

17. The system of claim 13 wherein the second Gaussian filter comprises parallel-in serial-out buffers configured to receive pixel data from the stripe buffer, multiplier accumulators configured to multiply outputs of the parallel-in serial-out buffers by Gaussian coefficients, and an adder tree configured to sum the outputs of the multiplier accumulators and to provide a Gaussian result.

18. The system of claim 13 wherein the stripe buffer includes a multiplexer configured to receive outputs of rows of the stripe buffer and to provide an output to the second Gaussian filter.

19. The system of claim 13 wherein the stripe buffer comprises a dual port Random Access Memory.

20. The system of claim 13 wherein each synchronization buffer is configured to compensate for different processing times of the scale sub-modules.

* * * * *